United States Patent [19]

Aho

[11] Patent Number: 4,490,063

[45] Date of Patent: Dec. 25, 1984

[54] TELESCOPIC TUBE AND METHOD FOR THE MANUFACTURE THEREOF

[75] Inventor: Yrjö Aho, Espoo, Finland

[73] Assignee: Exel Oy, Helsinki, Finland

[21] Appl. No.: 347,324

[22] Filed: Feb. 9, 1982

[30] Foreign Application Priority Data

Feb. 13, 1981 [FI] Finland .................................. 810457

[51] Int. Cl.³ .............................................. F16B 7/10
[52] U.S. Cl. .................................... 403/109; 403/334; 156/173
[58] Field of Search ................ 43/18.1, 18.5; 403/109, 403/334; 156/173, 175, 431

[56] References Cited

U.S. PATENT DOCUMENTS

| 2,541,609 | 2/1951 | Pullan | 43/18.1 |
| 2,757,002 | 7/1956 | Ryden | 403/109 X |
| 2,787,484 | 4/1957 | Macy | 43/18.5 X |

FOREIGN PATENT DOCUMENTS 1811156 11/1968 Fed. Rep. of Germany .
1292983 4/1962 France ............................. 43/18.1
105762 7/1924 Switzerland ...................... 403/109
1253578 11/1971 United Kingdom .

*Primary Examiner*—Andrew V. Kundrat
*Attorney, Agent, or Firm*—Morgan, Finnegan, Pine, Foley & Lee

[57] ABSTRACT

A telescopic tube, comprising a plurality of relatively sliding tube members (10, 11) fitted within each other. Along a major part ($L_0$) of their length, the tube members are straight cylindrical tubes whose ends are provided with conical bulges (14, 15), so that one end is provided with an external cone (14) which diverges towards the end and the other end is provided with an internal cone (15) which converges towards the end. The latter end is surrounded by an external annular flange (16). The external and internal conical bulges (14) and (15) of individual tube members (10) and (11) are wedged against each other with friction engagement and keep the telescopic tube in the extended condition.

5 Claims, 2 Drawing Figures

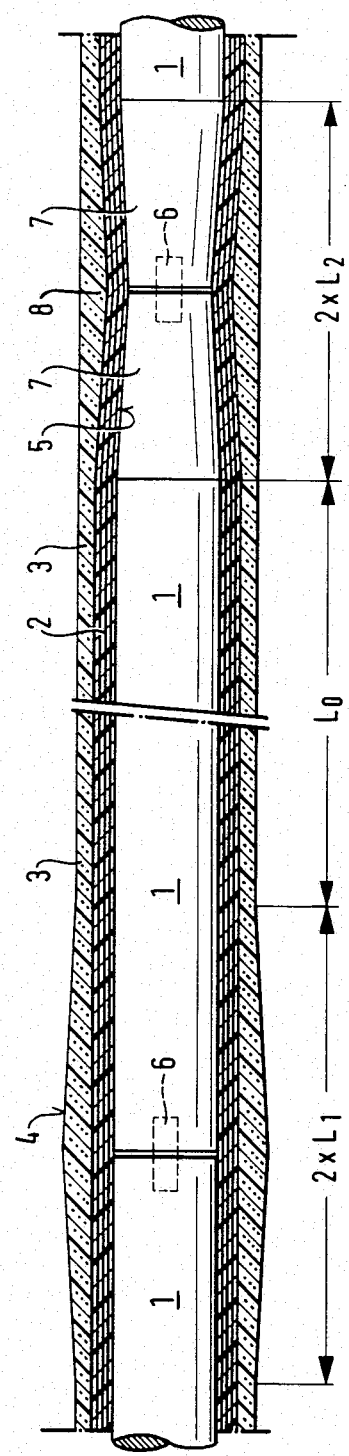
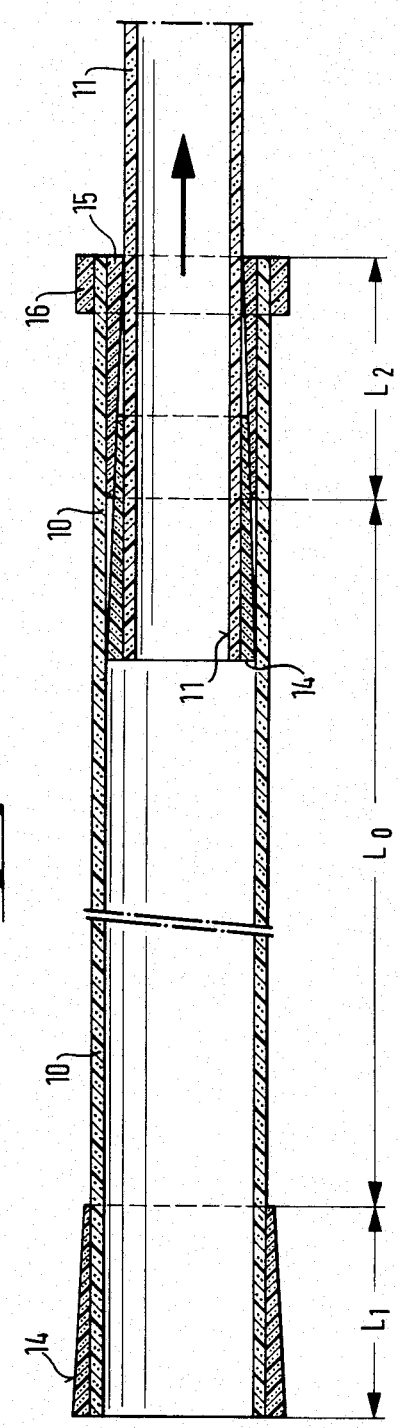
Fig. 1
Fig. 2

TELESCOPIC TUBE AND METHOD FOR THE MANUFACTURE THEREOF

BACKGROUND OF THE INVENTION

The present invention relates to a telescopic tube, comprising a plurality of tube members which are telescopically sliding within each other and whose conical faces are wedged against each other, so that the tube members cannot disengage from each other.

The invention also relates to a continuous method of manufacturing such telescopic tubes from reinforced plastic by successively arranging cores whose length equals that of the tube members and by covering such cores with layers of resin-moistened reinforcing fibers, first a layer of longitudinal fibers which is then covered with a layer of cross-fibers.

The invention relates to the type of telescopic tubes that can be used e.g. as antennae, fishing poles, lamp-posts, flagpoles etc. The usefulness of telescopic tubes is based on their capability of being retracted to a fraction of their full length for transport and storage.

Traditionally such telescopic tubes are made of tube members which are conical along their entire length. However, a telescopic tube assembly composed of conical tube members has several drawbacks. In order to keep the change of diameter per length unit within reasonable limits, the coning angle must be very small. When the tube members are wedging against each other, this small coning angle produces a great radial force which often damages the ends of the tube members. On the other hand, due to small coning angle, the tube members might be wedged so tightly against each other that retraction of a telescopic tube is not managed by regular force or without damaging the components. When a tube is conical over its entire length, a change of diameter along the entire length will be excessive; thus, the tube is too thick at the base and too thin at the top. This increases the weight of a tube especially when sufficient wall thickness is desired to eliminate the above-mentioned risk of damage.

The manufacture of tube products from reinforced plastic has grown vigorously. However, an automatic machine which produces all-conical telescopic tube will be expensive. This is because the manufacture of long, conical cores is difficult and thus expensive. In a continuously operated manufacturing process, the number of such cores must be up to 50–100. Therefore, the manufacture of conical telescopic tubes from reinforced plastic is not economically profitable by the present technology.

An object of the invention is to provide a novel type of telescopic tube in which the above drawbacks are eliminated and which can be manufactured by a continuous process more economically than heretofore.

SUMMARY OF THE INVENTION

In view of this object, a telescopic tube according to the invention is characterized in that along a major part of their length the tube members are straight cylindrical tubes provided with conical bulges at the ends, so that one end is equipped with an external cone that diverges towards said end and the other end is equippped with an internal cone that converges towards the end.

According to the invention, the method is characterized in that the external cone bulge is built-up by winding in the respective zone more cross-fibers and said internal cone is made from tapered ends of the cores and a thicker layer of cross-fibers wound thereon. The tapered core end and thicker layer of cross-fibers provide a tube member having one end which includes a cylindrical outer surface and a conical inner surface.

Compared with all-conical telescopic tubes, the solutions according to the present invention offer the following advantages:

(1) by virtue of the conical bulges at the ends only, the total diameter of the tube can be kept small which is why the telescopic tube will also be light.

(2) The conical bulges are made at the stress points of the telescopic tube thus giving extra thickness which is why the wall thickness can be kept small elsewhere, thus reducing even further the weight of the tube structure in view of its strength.

(3) The conical end bulges can be provided with a desired coning angle. Thus, a contact friction angle between the tube members can be chosen optimum for any given application, so that friction contact or engagement is either readily releaseable or capable of supporting even great axial loads. The engagement can be further improved by roughening the surfaces of the conical bulges.

(4) In the manufacture of tube members from reinforced plastic, it is possible to employ cores that are cylindrical almost along their entire length. Only one end of the cores must be provided with a tapered end which corresponds to the internal cone.

BRIEF DESCRIPTION OF THE DRAWINGS

The invention is further illustrated in the following detailed specification with reference made to the accompanying drawings, in which:

FIG. 1 is a longitudinal section of the tube member of a telescopic tube of the invention during the continuous manufacturing process, and FIG. 2 shows in longitudinal section two tube members of a telescopic tube of the invention with said members fitted within each other.

DETAILED DESCRIPTION OF THE INVENTION

Referring to FIG. 2, tube members 10 and 11 are fitted telescopically within each other. Along a major part of their length, each tube member is cylindrical. The cylindrical length of tube member 10 is designated by $L_o$. The left-hand end of tube member 10 is provided with an external conical bulge 14 diverging towards the tube end. Such a bulge can be a separate piece of plastic mounted e.g. by gluing, or it can be made simultaneously with the manufacture of the tube, as explained hereinbelow. The right-hand end of tube member 10 is provided with an internal conical bulge converging towards the tube end. Fitted within said tube member 10 is another tube member 11 whose outer diameter matches, with suitable sliding tightness, the smallest internal diameter of the internal cone 15. Provided on the outer surface of the left-hand end of tube member 11 is also a conical bulge 14 diverging towards the end of tube member 11. When a telescopic tube is opened, i.e. the tube member 11 is extended out of the tube member 10, the external conical bulge 14 of tube member 11 matches the internal conical narrowing 15 of tube member 10. Thus, the conical faces are wedged against each other into frictional engagement whose effectiveness depends not only on the quality of the surface, but particularly on the selected coning angle which can be freely chosen. In products, which need not be re-collapsed after they have been extended and which require a substantial axial load-carrying capacity, said coning angle can be selected smaller and the abutting surfaces roughened for a joint that is capable of withstanding even substantial forces. It should be especially appreciated that provision of the end cones increases the wall thickness where stress is at its heaviest due to the loading between the tube members. Thus, the end cone bulges 14, 15 simultaneously contribute both to solid engagement and increase the strength of the engaging sections.

If it is desired to produce a telescopic tube which cannot be disassembled after the manufacture, the end equipped with the internal cone 15 of each tube member is provided with a peripheral annular flange 16 after the installation of a tube to be mounted upon this particular tube member. In FIG. 2, a tube member to be mounted upon tube 10 has not been shown. The annular flange 16 further strengthens the tube member 10 where strength is most needed. Thus, the annular flange 16 also has a double-function; to act as an end stopper for the female tube and a receiver of the radial loading produced by the male tube member.

A sufficient length $L_1$ and $L_2$ for the cone sections, even in extreme loading situations, is approximately 10% to 15% of the total length of a tube member. However, length $L_1$ and $L_2$ should be more than 1% of the total length of a tube member. Compared with the diameter of a tube member, the length $L_1$ and $L_2$ of an end cone can vary within the range of $1 \times$ diameter to $10 \times$ diameter. Lengths $L_1$ and $L_2$ can be equal along the entire length of a telescopic tube but, when the diameter becomes smaller, the length of an end cone can also diminish e.g. in such a manner that the coning angle remains constant.

Referring to FIG. 1, the following is a description of the continuous manufacturing of a telescopic tube of the invention from reinforced plastic. A plurality of cores 1 are run successively in the machine, said cores being removably joined at joints 6. First ends of said cores 1 are provided with tapered ends 7 and these tapered ends are connected to each other. At every other joint 6, the straight ends of said cores are abutting. In the illustrated case, there is first applied on top of the cores a lengthwise fiber layer 2 e.g. that of glass fibers, moistened with a suitable binder. In the following step, a crosswise glass fiber layer 3 is wound around the tube member. Winding of the crosswise fiber layer 3 causes bulges 4, 8 to be formed in the region of the joints 6 between cores 1. Thus, in these regions are more fibers are wound around the tube member to be prepared. Therefore, there is produced an external bulge 4 in the region of the straight ends of cores 1. In the region of the tapered ends 7 of cores 1, however, there is formed an internal bulge 8 when the crosswise wound fiber layer 8 urges the inner surface 5 of the layer of lengthwise fibers against the tapered ends 7. Thus, at bulge 8, the external surface of the tube to be produced remains substantially the same diameter as the diameter of the tube member in the section designated $L_0$.

Next, the continuous tube material is cut into tube members at the joints 6 between cores 1 and the cores are pulled from the completed tube members. Finishing of the conical bulges 4 and 8 can be accomplished by either using molds or by machining on a lathe.

Depending on the desired production capacity, it is possible to manufacture a plurality of desired tube diameters on one production line or for each tube diameter it is possible to make an individual production line.

I claim:

1. A plastic reinforced telescopic tube comprising:
   a plurality of relatively slideable tube members, which are fitted within each other, which are straight cylindrical tubes along a major part of their lengths, and which are formed by coating a core having a straight end and a tapered end with layers of resin-moistened fibers including a layer of lengthwise fibers upon which is wound a layer of cross-fibers;
   an external conical bulge, which diverges towards the first end of each tube and which is formed by winding an additional layer of cross-fibers at the straight end of the core; and
   an internal conical bulge, having a substantially external cylindrical surface, which converges toward the second end of each tube and which is formed by winding an additional layer of cross-fibers at the tapered end of the core;
   whereby the conical faces of the bulges are long enough and so gently inclined that they insure friction engagement capable of supporting axial loads.

2. A telescopic tube according to claim 1 wherein the end of each tube member fitted with an internal conical bulge is surrounded with an annular flange.

3. A telescopic tube according to claim 1 wherein the lengths of the conical bulges are from 1 to 10 times the diameter of the corresponding tube members.

4. A method of continuously manufacturing telescopic tubes of reinforced plastic using cores with a tapered end and a straight end, said cores having a length substantially corresponding to that of the tubes, comprising the steps of:
   arranging successively a plurality of said cores with the tapered end of a first core disposed next to the tapered end of a second core and the straight end of the second core disposed next to the straight end of a third core;
   coating said cores with layers of resin-moistened reinforcing fibers, including a first layer of lengthwise fibers upon which is wound a layer of cross-fibers;
   forming an external conical bulge at every other joint of said cores where the ends are straight by winding additional cross-fibers; and
   forming an internal conical bulge having an external substantially cylindrical surface at every other joint of said cores where the ends are tapered by winding additional cross-fibers.

5. A method according to claim 4 which further includes the steps of:
   cutting the layers of resin reinforced fibers between the cores;
   removing the cores from the cut layers of resin reinforced fibers; and
   finishing the external and internal conical bulges formed on the cut layers of resin reinforced fibers.

* * * * *